United States Patent [19]

Wachsmuth

[11] 4,233,158
[45] Nov. 11, 1980

[54] LIQUID TREATMENT TANK HAVING A VOLUME COMPENSATING STRUCTURE FOR USE WITH VOLUME VARIABLE LIQUID TREATMENT MATERIAL

[76] Inventor: William A. Wachsmuth, 1531 Pinetree Crescent, Mississauga, Ontario, Canada, L5G 2S9

[21] Appl. No.: 956,670

[22] Filed: Nov. 1, 1978

[51] Int. Cl.³ .............................................. B01D 23/10
[52] U.S. Cl. ................................ 210/283; 210/289; 210/291
[58] Field of Search .......................... 210/266, 283–285, 210/289–291

[56] References Cited

U.S. PATENT DOCUMENTS

| 1,675,860 | 7/1928 | Neumann | 210/190 |
| 2,572,848 | 10/1951 | Fitch | 210/24 |
| 2,666,741 | 1/1954 | McMullen | 210/24 |
| 3,117,084 | 1/1964 | Nick et al. | 210/241 |
| 3,335,868 | 8/1967 | Schiffers | 210/274 |
| 3,382,169 | 5/1968 | Thompson | 210/32 |
| 3,497,069 | 2/1970 | Lindenthal et al. | 210/282 |
| 3,554,377 | 1/1971 | Miller | 210/283 |
| 3,617,558 | 11/1971 | Jones | 210/290 |
| 3,719,591 | 3/1973 | Crits | 210/283 |
| 3,960,721 | 6/1976 | Heskett | 210/283 |

*Primary Examiner*—Ivars C. Cintins
*Attorney, Agent, or Firm*—Shlesinger, Arkwright, Garvey & Dinsmore

[57] ABSTRACT

A liquid treating apparatus in which a vertically disposed tank has a series of longitudinally arrayed volume variable beds of liquid treatment material with fluid permeable partitions between the beds which move longitudinally in response to expansion and contraction of the beds. Forming a part of each partition and moving therewith is a fluid conduit system for collecting and distributing fluids between pairs of beds.

33 Claims, 16 Drawing Figures

LIQUID TREATMENT TANK HAVING A VOLUME COMPENSATING STRUCTURE FOR USE WITH VOLUME VARIABLE LIQUID TREATMENT MATERIAL

FIELD OF THE INVENTION AND BACKGROUND

This invention concerns a liquid treatment apparatus in which a plurality of treatment beds are housed in a vessel through which a liquid to be treated is passed. More specifically, it is concerned with a tank structure for use with volume variable treatment beds.

A major use of this type apparatus is in the demineralization of water using beds of ion exchange resins and this description will largely deal with the use of the invention as a demineralizer. However, the invention may be used in other types of liquid treatments with other kinds of volume variable liquid treatment beds. These will be discussed later in the application.

There are three common systems presently used for demineralization of water (excluding distillation): the separate tank system, the mixed bed system and the multiple bed system.

In the separate tank system, cation exchange resin is contained in one vessel and anion exchange resin in another separate vessel. Each vessel has a top collector/distributor and a bottom collector/distributor and usually another collector/distributor in the top layer of resin, or just above it for the addition and removal of water, and of backwash water, chemical solutions, and resins. Each vessel has its own associated piping valves, controls and necessary regeneration equipment. The vessels are connected in series. Water flows through the cation exchange vessel, then through the anion exchange vessel, and when the ion exchange resins are exhausted, the vessels are taken out of service, the resins regenerated and then returned to service. The ion exchange resins can be regenerated with a fluid flow in the same direction as the normal water flow, i.e. concurrent regeneration, or the regeneration may be performed in a direction opposite to the normal water flow, countercurent regeneration. The best quality of effluent demineralized water is achieved when counter-current regeneration is performed. A major disadvantage with this type of a system is the cost involved in providing each bed with its own tank each having its own pipes, valves and controls.

In the mixed bed system, the cation and anion exchange resins are thoroughly mixed together, usually by air agitation, and contained in one vessel. The water passes through the mixed resins, and usually excellent quality demineralized water is produced. The vessel contains top and bottom collector/distributors and a structurally very strong and expensive conduit system for the collection or distribution of fluids fixed in place at the position where the cation and anion resins are supposed to separate (by backwashing) prior to regeneration, and often another collector/distributor just above the top of the ion exchange bed. There are external pipes, valves, controls, and regeneration equipment. Water flows down through the mixed bed resins until the resins are exhausted and then the vessel is taken off line for regeneration. Water is introduced into the bottom of the vessel and flows upwards through the vessel and this carries the lighter resin to the top of the bed thus separating the resins. The separation is supposed to occur where the central conduit system is located. Separate regeneration of the cation and anion resins is then conducted using the central conduit system in treating individually first the cation resin above and then the anion resin below it. After this the resins are thoroughly mixed and the vessel is returned to service. A problem arises, however, if the resin separation does not occur at the level of the central conduit system.

To avoid the disadvantages of these two systems a third system has been used: a multiple bed apparatus in which the cation and anion beds are situated in one tank separated by a fluid permeable partition to prevent their intermixing. Usually this partition is mounted in a fixed position on the tank walls, a disadvantage in a tank containing volume variable beds of ion exchange resins which expand and contract as they are exhausted and then regenerated. An expanding bed would put pressure on the immovable bed partition which could do structural damage to the apparatus. The U.S. Pat. Nos. to Miller, 3,554,377 and Lindenthal, 3,497,069, disclose two approaches to this problem. In Miller, the various beds are separated by longitudinally movable filters which prevent intermixing of the beds while being free to move longitudinally in response to bed compaction caused by the pressure of the liquid flow. In Lindenthal, the respective beds are separated by resilient foam partitions which expand and contract to compensate for changes in volume of the beds.

Multiple bed treatment devices present an additional problem encountered during regeneration of the beds analgous to the fixed conduit system problem of the mixed bed system. Since each bed has a different chemical makeup, each requires a different chemical treatment to be regenerated. Prior art devices have approached this problem by positioning fluid conduit distribution and collection systems between the beds so that the beds can be treated individually. These conduit systems are, however, as is so often the case with bed partitions, mounted in fixed positions relative to the tank. Since they cannot move with the volume changes of the respective beds, they must necessarily be of extra strong construction to resist the volume changes. Also, a volume change in the beds may cause a shift of material moving the interface of a pair of beds away from the fluid conduit system. No provision has been made for devices having one or more volume variable beds each requiring individual treatment combining the advantage of a moving bed separator which adjusts to volume changes with a between-bed fluid conduit system for the individual treatment of beds.

OBJECTS AND SUMMARY OF THE INVENTION

An object of the invention is to provide a liquid treatment apparatus in which the partitions separating the respective beds are movable to allow for expansion and contraction of the beds while the beds contained therein may be individually regenerated or otherwise treated while in place.

An object of this invention is to provide a liquid treatment apparatus in which the partitions separating the successive beds are movable to allow for changes in the volumes of the beds and in which the contents of any one bed may be independently removed from the tank for treatment or replacement.

Another object of the invention is to provide a liquid treatment apparatus which avoids the complex expensive reinforced structure required of immovable fluid collecting and distributing conduit systems situated between volume variable beds.

A further object of the invention is to provide a structure in which the conduit systems situated between the beds for individual treatment of the beds remain between the beds despite volume variations in the beds.

An object of the invention is to provide a liquid treatment apparatus in which the bed partitions are longitudinally movable to compensate for volume variations in the beds and in which fluid collecting and distributing systems between beds are likewise longitudinally movable to remain at the interfaces of the beds.

Another object of the invention is to provide an apparatus having a volume compensating structure which also includes means by which liquids being treated in the tank may be removed from the tank at the interface of two beds for external treatment regardless of the location of that interface and returned to the tank at the point where removed to continue treatment without mixing of the liquid being removed with that being returned.

Another object of the invention is to provide a liquid treatment apparatus having a volume compensating structure which includes movable bed partitions with means preventing the liquid treatment materials of the beds from contacting the bed partitions.

A further object of the invention is to provide a liquid treatment tank structure having movable bed partitions and movable conduit systems for individually treating the beds for use in tanks with large cross-sections.

These objects are achieved by a fluid treatment apparatus comprising a generally vertically disposed tank having a plurality of fluid permeable beds arranged in longitudinal sequence in the tank generally one above the other, each of the beds being composed of a fluid treatment material and at least one of the beds beneath the topmost bed being volume variable. Each of the volume variable beds has a fluid permeable partition situated above it separating the bed from the next bed above it. Each partition is freely longitudinally movable with respect to the tank and includes a partition conduit system for collecting and distributing fluids at the partition. Each partition has associated therewith a main fluid conduit passing between the inside and the outside of the tank to which the partition conduit system is connected. Each partition includes a seal about its periphery which engages the inside wall of the tank to prevent the passage of fluid treatment material between the partition and the inside wall of the tank while permitting the relative movement of the parition with respect to the tank.

In a two bed apparatus the main fluid conduit passing between the inside and the outside of the tank includes a generally longitudinally extending rigid first portion having its lower end connected to the partition conduit system and a flexible second portion connected to the rigid first portion and extending to the wall of the tank, the flexible second portion permitting the longitudinal movement of the partition separating the two beds.

For larger tanks having two beds the bed partition may comprise a plurality of fluid permeable partitions each being a sector of a circle such that all the partions define a complete circle. The partitions are separated from one another by wall coinciding with radii of the tank and extending longitudinally into the upper and lower beds past the limits of the longitudinal travel of the partitions. Each partition includes its own partition conduit system and a main fluid conduit passing between the inside and the outside of the tank which is connected to the partition conduit system.

In a modified embodiment a tank may include an impermeable partition separating adjacent beds. A first partition conduit system is attached to and positioned immediately above the impermeable partition for collecting and distributing fluids immediately above the partition and a second partition conduit system is attached to and positioned immediately below the impermeable partition for collecting and distributiong fluids immediately below it. Two main fluid conduits each passing between the inside and the outside of the tank are respectively connected to the first and second partition conduit systems.

DETAILED DESCRIPTION

Figure 1:
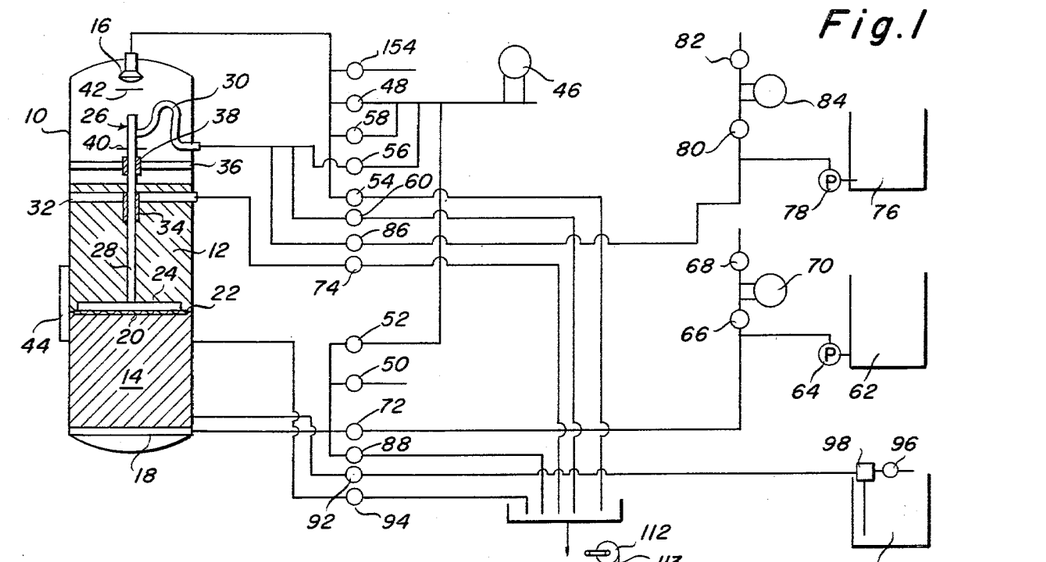
FIG. 1 is a schematic representation of an apparatus according to the invention.

Referring to FIG. 1, a cylindrical elongated liquid treatment tank 10 is arranged in a generally vertical position. Positioned in the tank 10 is an upper fluid permeable bed 12 of cation exchange resin in granular form and a lower fluid permeable bed 14 of granular anion exchange resin. The beds are arranged generally one above the other. Situated at the top of the tank is an upper collector/distributor 16 through which fluids may be added to or removed from the tank 10. The upper collector/distributor 16 is such that fluids being added to the tank 10 are evenly distributed about the top thereof. Located adjacent the base of the tank 10 is a lower collector/distributor 18 which comprises a system of conduits disposed in a plane perpendicular to the longitudinal axis of the tank 10 having a plurality of inlet/outlet ports for the collection or distribution of fluids.

The lower collector/distributor 18 is situated adjacent the base of the lower bed 14. A rising space exists between the upper collector/distributor 16 and the top of the bed 12.

Separating the beds 12 and 14 is a fluid permeable partition 20 which acts to prevent the passage of the exchange resins making up the contents of either bed. The partition 20 is a generally circular plate disposed in a plane perpendicular to the longitudinal axis of the tank 10 and is freely longitudinally movable with respect to the tank 10. The partition 20 rests upon the top of the lower bed 14 and in turn supports the upper bed 12. To prevent the passage of the contents of the respective beds around the periphery of the partition 20, the partition 20 has situated about its periphery an annular sealing ring 22 which slideably engages the inside wall of the tank 10.

Attached to the bed partition 20 so as to form an integral part thereof and laid out in a plane immediately adjacent to and parallel to the bed partition 20 is a partition conduit system 24 by which fluids may be added to or removed from the tank 10 between the beds 12 and 14. The partition conduit system 24 is a grid of conduits laid out throughout the circular plane bounded by the inside wall of the tank 10 so that the fluids may be evenly added to or removed from the tank 10 throughout the area bounded by the inside wall of the tank 10 comprising the interface of the beds 12 and 14. Although represented as being disposed immediately above the partition 20, the partition conduit system 24 may be also located immediately below the bed partition 20 as long as it remains essentially between the beds 12 and 14. The partition conduit system 24 is in communication with a main partition fluid conduit 26 which passes between the inside and the outside of tank 10 and is the means by which fluids collected at the partition conduit system 24 are removed from the tank 10 and by which fluids to be added at the conduit system 24 are added to the tank 10. While one such main conduit is shown in this embodiment, a partition conduit system may have a plurality of main partition conduits. The main partition fluid conduit 26 includes a rigid first portion 28 which extends generally longitudinally or vertically with its lower end connected to the partition conduit system 24. At its upper end the first portion 28 is connected to the second portion 30 of the main partition fluid conduit 26. The second portion 30 is flexible and extends from the first portion 28 to the wall of the tank 10. This flexible second portion 30 permits the longitudinal movement of the bed partition 20, the partition conduit system 24 and the first portion 28 of the main partition fluid conduit 26.

Positioned adjacent the top of the upper bed 12 is an upper bed conduit system 32 disposed in a plane perpendicular to the longitudinal axis of the tank 10 in a manner similar to that of the lower collector/distributor 18, the bed partition 20 and the partition conduit system 24. The upper bed conduit system 32 is used for the collection of fluids from and the distribution of fluids to the tank 10. As with the partition conduit system 24, it comprises a grid of conduits laid out throughout the circular plane bounded by the inside wall of the tank 10 so that fluids may be evenly added to or removed from the tank 10 throughout the plane in which the upper bed conduit system 32 lies. While shown slightly below the top of the upper bed 12, the upper bed conduit system 32 may be positioned on top of the upper bed 12.

Situated centrally in the upper bed conduit system 32 and fixed in position relative to tank 10 is an annular or cylindrical guide sleeve 34 provided an opening through which the rigid first portion 28 of the main partition conduit 26 extends. Spaced from this guide sleeve 34 at a point higher up in the tank 10 is an upper guide sleeve support 36 having centrally located thereon an upper annular or cylindrical guide sleeve 38. The guide sleeves 34 and 38 are longitudinally aligned and act to prevent any lateral movement of the bed partition 20, the partition conduit system 24 and the first rigid portion 28 of the main partition conduit 26 while permitting their free longitudinal movement within the tank 10. While two guide sleeves are shown in this embodiment, one guide sleeve may be sufficient. When multiple guide sleeves are used, one may be placed below the screen and one above. A very small flow of clean water at a pressure slightly higher than that in the tank 10 flows to the guide sleeves by a means not shown to purge them continuously.

Longitudinal movement of the bed partition 20 and the partition conduit system 24 is limited by lower stop 40, which prevents downward movement of the rigid first portion 28 of the main partition conduit 26 beyond a certain point by engaging the upper guide sleeve 38, and the upper stop 42, which prevents upward longitudinal movement of the bed partition 20 and the partition conduit system 24 beyond a certain point when the top of the first rigid portion 28 of the main partition conduit 26 contacts it. In addition to preventing excessive longitudinal movement of the bed partition and the partition conduit system 24 during tank operations, the lower stop 40 also acts to support the bed partition 20 and the partition conduit system 24 whenever all or a portion of the lower bed 14 is removed from the tank 10.

Located in the side of the tank 10 is a view window 44 through which conditions inside the tank 10 may be observed during operations including the longitudinal position of the bed partition 20 and the partition conduit system 24.

As mentioned, anion exchange resin in granular form forms the lower bed 14 between the lower collector/distributor 18 and the bed partition 20. Cation exchange resin in granular form forms the upper bed 12. The amounts of anion and cation exchange resins to be used are calculated from the raw water analysis of the water to be demineralized, from known capacities of the resins, the flow rates desired, and the required length of the service run. The resin bed depths are usually reasonably deep in the counter-current method of operation (i.e., where regeneration is conducted with the flow of regenerating fluids opposite to the flow during raw water treatment). The technology for calculating resin volumes, vessel diameters, flow rates, quantities of acid and caustic required for regeneration are well known. The free space above the cation resin bed 12 within the tank 10 provides for expansion of the resins during operations.

Raw water enters the tank 10 through the meter 46, the valve 48 and the upper collector/distributor 16, flows downwards through cation resin bed 12, the bed partition 20, the anion resin bed 14, and into the lower collector/distributor 18 and out to service through the valve 50. When the ion exchange resins are exhausted valves 48 and 50 are closed and the unit is taken out of service for regeneration of the ion exchange beds. During the exhaustion cycle of the resins, their volume shrinks. The anion resin volume decreases by about 15% (20% to 25% theoretically). As the bed 14 decreases in volume, the bed partition 20, the partition conduit system 24 and the first portion 28 of the main partition conduit 26 move downward along with the cation bed 12. Thus the bed partition 20 and the partition conduit system 24 act to always remain at the interface of the beds 12 and 14 regardless of their relative volumes and the position of their interface in the tank 10. In this manner the partition conduit system 24 is always available at any point in the operation for treatment of either the upper bed 12 or the lower bed 14 as in the regeneration process.

To begin the regeneration process, in which cation resin is converted to the hydrogen form and anion resin to the hydroxide form, backwash water is introduced at a controlled rate to the lower collector/distributor 18 by opening valve 52. Water flows upwards through the beds 12 and 14 and out to waste through the upper collector/distributor 16 and the valve 54. The rate of flow is such that the anion resin is expanded slightly to remove any insoluble particles that may have been trapped in it from the raw water and also to loosen the resin bed. An additional amount of backwash water is added between the beds 12, 14 by means of the partition conduit system 24 and the main partition conduit 26 by opening valve 56 and the total flow of water flowing upwards through the cation resin bed 12 is sufficient to fully expand the cation resin and thoroughly backwash it. Backwashing continues for an adjustable time period to remove insoluble inpurities from the resins and to loosen them. The partition 20 and the partition conduit system 24 move upwards during expansion of the anion bed 14. Backwashing can be done before every regeneration but in many installations may be done only occasionally. When backwashing is completed the valves 52, 54 and 56 are closed.

A downward blocking flow of water at a controlled rate is then established by opening valve 58 and valve 60. Water flows downward through the upper bed 12 to the partition conduit system 24 and then upwards through the main partition fluid conduit 26 and through the valve 60 to waste. This blocking flow prevents caustic used in treating the lower bed 14 from contacting the upper bed 12, and holds the lower bed 14 down.

Caustic is then pumped by caustic pump 64 at a controlled rate from the tank 62. The caustic is diluted by opening valve 66 and adding water at a rate controlled by the rate set valve 68 and the meter 70. The dilute caustic then flows through the valve 72 to the lower collector/distributor 18 and up through the lower bed 14 of anion resin to the partition conduit system 24 where it mixes with the blocking water flow and is carried out to waste through the main partition conduit 26 and then through the valve 60. The caustic is added at a controlled rate over a preset period of time and may be cold or heated. The amount added is sufficient to convert all of the anion resin to the hydroxide form. During caustic introduction the anion resin swells and the volume of the bed 14 increases by about 15% (theoretically 20% to 25%) and the bed partition 20, the partition conduit system 24, and the cation resin bed 12 above them move upwards. When the prescribed amount of caustic has been added, the caustic pump 64 is stopped and the dilution water continues to flow to rinse the excess caustic from the resin for a prescribed period of time. Then valves 66, 72, 58 and 60 are closed.

A downward blocking flow of water is then established through a small upper layer of the cation resin bed 12 by introducing a controlled flow through valve 58 and the upper collector/distributor 16 to the upper bed conduit system 32 and then out to waste through the valve 74. Acid is then pumped from the tank 76 by the acid pump 78. It is diluted by opening valve 80 through which dilution water is added at a controlled rate by the rate set valve 82 and the meter 84. The diluted acid then flows through the valve 86 and the main partition fluid conduit 26 to the partition conduit system 24 and from there up through the upper bed 12 to the upper bed conduit system 32 where it joins with the blocking water flow and is carried to waste through the valve 74. When the prescribed amount of acid has been added (at a prescribed flow rate over a prescribed period of time) to convert the cation resin to the hydrogen form, the acid pump 78 is stopped while the dilution water continues to flow to rinse excess acid from the cation resin. After a prescribed period of time, the valves 58, 74, 80 and 86 are closed. A final rinse is then applied by opening valves 48 and 88 to establish a downward flow of water through both beds 12, 14. This water flow is conducted to waste until the desired effluent quality is obtained (usually determined by measuring the conductivity of the effluent) then the valve 88 is closed. The vessel is then returned to the service mode by opening valve 50 and water flows to service until the ion exchange resins are once again exhausted, an event usually determined by a rise in conductivity or by measuring the total gallons that flow through the ion exchange resins. At that time the vessel is taken out of service again by closing the valves 48 and 50 and the regeneration sequence is repeated.

The structure of the tank 10 also facilitates special backwashing or special treatment of the anion exchange resin making up the lower bed 14. Resin may be removed from the tank 10 and transferred to the tank 90 by opening valves 52 and 92 and trasferring resin out until one half of the anion resin is carried to tank 90. The other half of the anion resin remains in the tank 10 and the bed partition 20 and the partition conduit system 24 move downward until the lower stop 40 rests upon the upper guide sleeve 38. Valves 52 and 92 are then closed. The anion exchange resin remaining in the tank 10 is then backwashed by opening valve 52 and valve 94. Water flows upward through the anion resin bed 14 and then to waste through valve 94. Then valves 52 and 94 are closed. The anion resin in the tank 90 is backwashed separately after which it is transferred back to the main tank 10 by opening valve 96 and establishing a water flow through an ejector 98 thereby carrying resin through the valve 92 to the vessel 10. Excess water rises up through the tank 10 and is carried to waste through valve 54. When all the anion resin has been transferred back to the tank 90, valves 96, 92 and 54 are closed.

In certain situations where required, all of the anion exchange resin can be transferred to the tank 90 where it can be given special cleaning or chemical treatment and then be returned to the tank 10. When all of the anion resin is out of the tank 10, the cation resin forming the bed 12 can also be given special backwash, cleaning or chemical treatment while it remains in place in the tank 10.

Figures 2, 3:
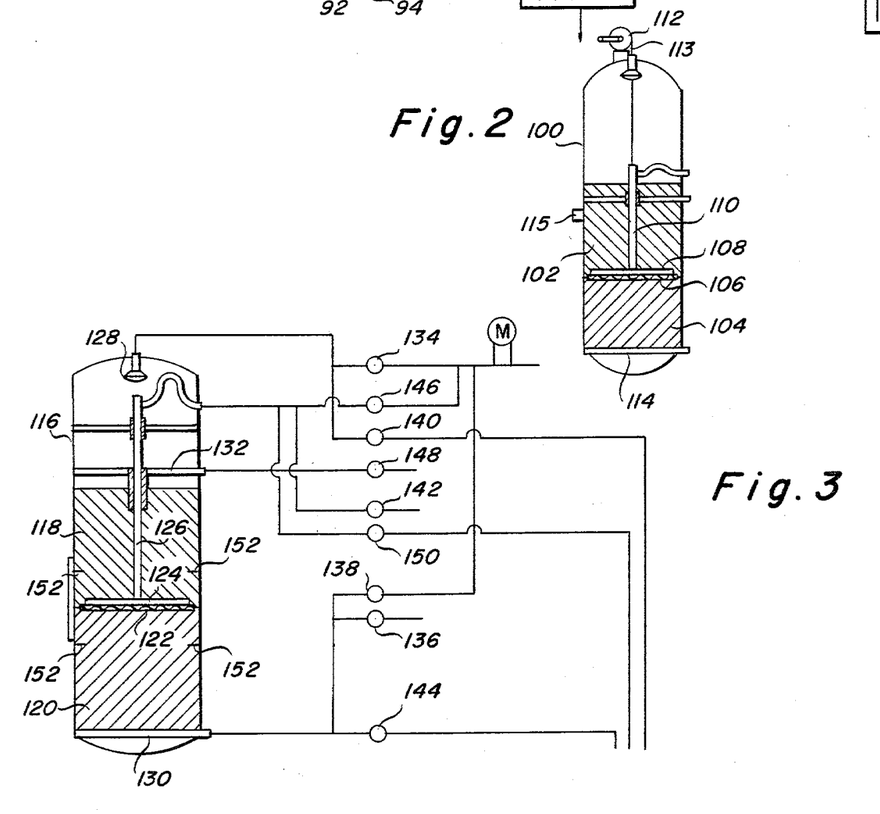
FIG. 2 is a schematic representation of an apparatus according to the invention having means for lifting the bed partition from the lower end.
FIG. 3 is a schematic representation similar to FIG. 1 showing an apparatus according to the invention with a support system for bed regeneration fluid flow in the same direction as the direction of the fluid flow during liquid treatment.

In some instances it may be desirable to be able to give the anion resin forming the lower bed 14 a full backwash within the service vessel. Referring to FIG. 2, a tank 100 is shown having an upper bed 102 of cation exchange resin and lower bed 104 of anion exchange resin separated by a fluid permeable bed partition 106 which includes a partition conduit system 108 similar to the bed partition 20 and partition conduit system 24 of the tank 10 of FIG. 1. Partition conduit system 108 has connected to it a main partition fluid conduit 110 communicating with the outside of the tank 100 for the addition or removal of fluids at the interface of the beds 102 and 104. Tank 100 includes a winch 112 externally mounted at the top of the tank 100. A rope or wire cable 113 extends from the winch to the main partition fluid conduit 110. By means of this winch 112 and cable 113 the partition 106 and the partition conduit system 108 may be lifted from the top of the lower bed 104 and raised until the main partition conduit 112 contacts the first stop (not shown). In this position the partition 106 will be above the top of the anion exchange bed 104 by a distance equal to the height of the anion exchange bed. The anion resin can then be backwashed in place at full backwash rates for anion resins by introducing water through the lower collector/distributor 114 and removing it through nozzle 115 which will be located just below the raised level of the partition 106.

The discussion thus far has dealt with counter-current regeneration, i.e. regeneration in which the flow of regeneration fluids is in the direction opposite to that of the fluid treatment flow. With some modification of the external pipe system, concurrent regeneration, i.e. regeneration in which the flow of regenerative fluids is in the same direction as that of the fluid treatment flow, may also be conducted. Referring to FIG. 3, a tank 116 has an upper bed 118 of cation exchange resin and a lower bed 120 of anion exchange resin. Resin quantities are calculated in accordance with data available for concurrent regeneration. In general more resin will be required to provide the same run length and demineralized effluent quality will be poorer than with the countercurrent method. Resin bed depths can be less than in the case of the counter-current system. Separating the beds 118 and 120 is a fluid permeable bed partition 122 which includes a partition conduit system 124. Connected to the partition conduit system 124 and connecting it to the outside of the tank 116 is a main partition fluid conduit 126. The partition 122, the partition conduit system 124, and the main partition conduit 126 have structures similar to their counterparts in FIG. 1. The tank 116 also includes an upper collector/distributor 128, a lower collector/distributor 130 and an upper bed conduit system 132 similar to the corresponding elements of the tank 10 of FIG. 1. The operation of the tank 116 in treating liquids is the same as that for the tank 10 of FIG. 1. When the resins are exhausted the initial regenerative step of backwashing the resins is performed in the same way as in the previous method.

Dilute caustic is then directed to the tank 116 through valve 142, enters the tank 116 between the beds 118 and 120 at the partition conduit system 124, and then proceeds down through the anion resin of the lower bed 120 to the lower collector/distributor 130 and from there to waste through the valve 144. When the prescribed amount of caustic has been added, the caustic flow is stopped but the dilution water continues to flow for a prescribed period of time to rinse excess caustic from the anion resin. The valves 142 and 144 are then closed.

Dilute acid is then released into the upper bed conduit system 132 via the valve 148 or is admitted to the tank 116 through the upper collector/distributor 128. The acid then flows down through the cation resin of the upper bed 118 to the partition conduit system 124 located between the beds 118 and 120 and from there to waste through the main partition conduit 126 and through the valve 150. When the prescribed amount of acid has been added, the acid is stopped but the dilution water continues to flow to rinse excess acid from the cation resin for a prescribed period of time. Then the valves 148 and 150 are closed. The final rinse and return of the tank 116 to service are performed in a manner similar to that for the tank 10 of FIG. 1.

Tank 116 provides an alternative structure for limiting the longitudinal movement of the partition 122 and the partition conduit system 124. Situated on the interior wall of the tank 116 are stops or protrusions 152 which engage the periphery of the partition 122. About four protrusions evenly spaced about the circumference of the tank 116 for each of the upper and lower stops would be appropriate.

There are many systems available for the delivery of acid and caustic to the service tank. The acid may be initially at low strength and later at higher strength. The caustic may be cold or heated and ejectors may be used in place of pumps. There are also many methods for transferring resin from the service vessel to an external vessel for backwashing and/or chemical treatment. Any method may be used with the invention. The cation resin may be regenerated ahead of the anion resin or their regenerations may overlap. A combination of countercurrent regeneration for one resin and concurrent regeneration for the other may be used. Rinsing and backwashing procedures may be varied. The invention may be adapted for these different procedures and the systems shown in FIGS. 1 and 3 were chosen for the sake of simplicity of description. In some installations it may not be necessary to backwash the anion resin and the invention can easily be adapted to backwash the cation only or a combination may be used of frequent cation backwashes and infrequent total bed backwashes. Any desired system may be used. Simply speaking the use of a freely longitudinally movable bed partition with a freely longitudinally movable partition conduit system makes possible a wide variety of treating techniques in which the beds may be individually treated.

Also included in FIG. 1 is an air inlet valve 154. Air or any other appropriate gas can be used for the blocking flow in the counter-current regeneration techniques in place of water. If air or another gas is used, the water supply and valves can be eliminated. The use of air instead of water will also reduce the total liquid volume sent to waste.

In the structures of FIGS. 1 and 3 the upper bed conduit system 32 or 132 is attached to the interior wall of the tank 10 or 116 where it supports the guide sleeve 34. The material above the bed partition 20 or 122 contracts and expands during the exhaustion and regeneration cycles and this can apply pressure to the upper bed conduit system 32 or 132. Also, when the material above the partition is backwashed, the material expands and applies pressure on the upper bed conduit system. The upper bed conduit system, if fixed in position, must be held in place by complex strong structural supports and these can be eliminated if it can move freely with the movement of the material. To provide for this a modified structure is shown in the tank 156 of FIG. 4 which includes an upper bed 158 of cation exchange resin, a lower bed 160 of anion exchange resin, an upper collector/distributor 162 and a lower collector/distributor 164. Separating the beds 158 and 160 is a fluid permeable bed partition 166 which includes a partition conduit system 168 connected to a main partition conduit 170 having access to the outside of the tank. The main partition conduit 170 has a generally longitudinally extending rigid first portion 172 which extends through the upper bed 158 and a flexible second portion 174. A guide sleeve support 176 is mounted in the tank 156 above the top of the upper bed 158. Centrally located in the guide sleeve support 176 is an annular or cylindrical guide sleeve 178 through which the rigid first portion 172 of the main partition conduit 170 extends and which acts to prevent lateral movement of the partition 166 and the partition conduit system 168 during their free longitudinal movement.

Figure 4:
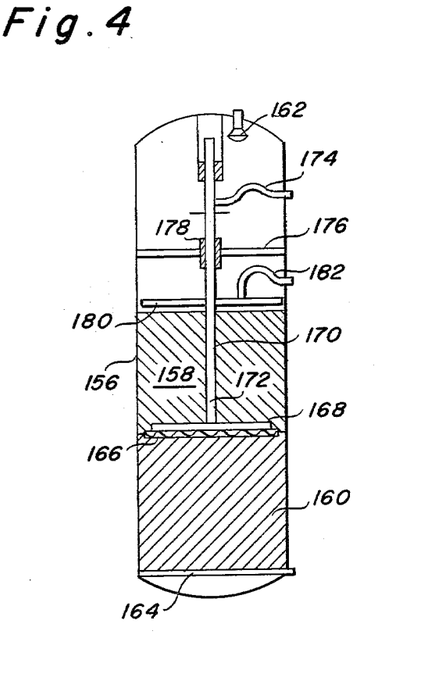
FIG. 4 is a schematic representation of a modified form of the apparatus of FIG. 1 showing a device in which an upper bed conduit system is movable in response to expansion and contraction of the beds along with the bed partition and its fluid conduit system.

Situated in the tank 156 is an upper bed conduit system 180 similar in structure and in location to the upper bed conduit system 32 of FIG. 1 except in that the conduit system 180 of tank 156 is fixed to the rigid first portion 172 of the main partition conduit 170 so that it moves longitudinally with the free longitudinal movement of the rigid first portion 172 of the main partition conduit 170 and the bed partition 166. As with the partition conduit system 168, the upper bed conduit system 180 is connected to a flexible main fluid conduit 182 which is connected to the wall of the tank 156.

Figure 5:
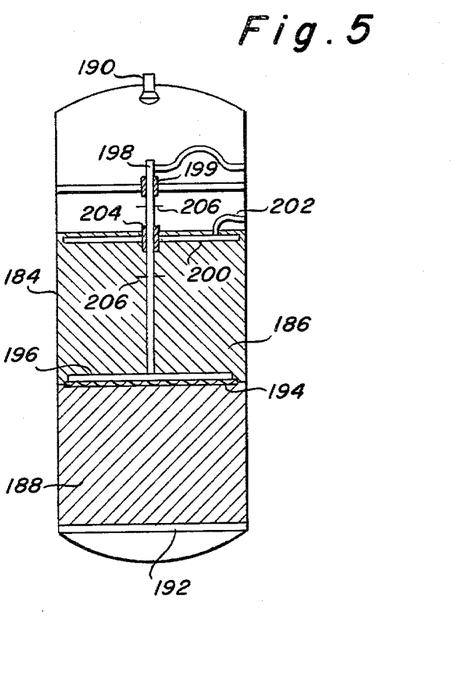
FIG. 5 is a schematic representation of a modified form of the structure of FIG. 4 in which the upper bed conduit system is movable relative to the tank and the bed partition in response to expansion and contraction of the beds.
Figures 6, 7:
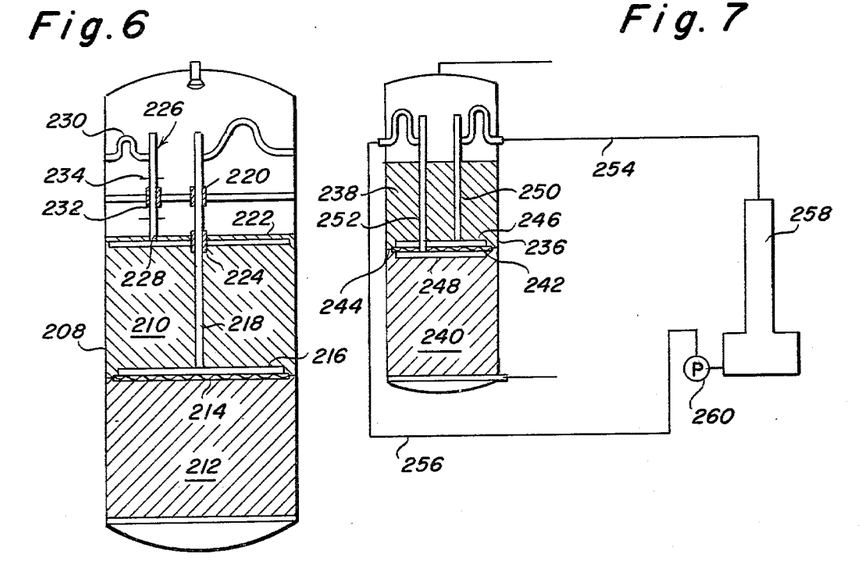
FIG. 6 is a schematic representation of a modified form of FIG. 5.
FIG. 7 is a schematic representation of an apparatus according to the invention having an impermeable bed partition permitting the removal from and the return to the tank of the liquid being treated for intermediate external treatment.

Other structures which allow for the longitudinal movement of the upper bed conduit system are shown in FIGS. 5 and 6. Referring to FIG. 5, a tank 184 has an upper bed 186 of cation exchange resin and a lower bed 188 of anion exchange resin, an upper collector/distributor 190 and a lower collector/distributor 192. A fluid permeable bed partition 194 is located between the upper bed 186 and the lower bed 188 and includes a partition conduit system 196. Both the partition 194 and the partition conduit system 196 are freely longitudinally movable with respect to the tank 184. The partition conduit system 196 is connected via a main partition fluid conduit 198 to the exterior of the tank 184. The main partition conduit 198 has a rigid first portion which extends generally longitudinally through the upper bed 186. Its lower end is connected to the partition conduit system 196. The rigid first portion of the main partition conduit 198 extends through a cylindrical or annular guide sleeve 199 which prevents lateral movement of the rigid first portion of conduit 198, the bed partition 194 and the partition conduit system 196. Located in the upper bed 186 adjacent the top thereof is the upper bed conduit system 200, which has a structure similar to the upper bed conduit system 32 of FIG. 1. The upper bed conduit system 200 is connected to an upper bed conduit system main fluid conduit 202 which is flexible and connects the conduit system 200 to the wall of the tank 184. Centrally located in the upper bed conduit system 200 is an annular or cylindrical guide sleeve 204 through which the rigid first portion of the main partition conduit 198 extends. The annular guide sleeve 204 is free to slide longitudinally on the first portion of the conduit 198. The upper bed conduit system 200 is therefore also freely longitudinally movable with respect to the bed partition 194, the partition conduit system 196 and the tank 184. The longitudinal movement of the upper bed conduit system 200 is bounded by projections or protrusions 206 on the rigid first portion of the fluid conduit 198 which act to engage the annular sleeve 204.

Referring to FIG. 6 a tank 208 has an upper bed 210 of cation exchange resin and a lower bed 212 of anion exchange resin, and a fluid permeable bed partition 214 including a partition conduit system 216. A main partition fluid conduit 218 connects the partition conduit system 216 to the exterior of the tank 208. The main partition conduit 218 has a generally longitudinally extending rigid first portion with its bottom end connected to the partition conduit system 216. The rigid first portion of the main partition conduit 218 extends through an annular guide sleeve 220 which prevents lateral movement of the rigid first portion of the conduit 218, the partition 214 and partition conduit system 216 during longitudinal movement thereof. Positioned in the upper bed 210 adjacent the top thereof is an upper bed conduit system 222 for the collection or distribution of fluid at that point in the tank 208. The upper bed conduit system 222 has a structure similar to that of the upper bed conduit system 32 of FIG. 1. Centrally located on the upper bed conduit system 222 is an annular or cylindrical guide sleeve 224 which defines an opening through which the rigid first portion of the fluid conduit 218 extends. The annular guide sleeve 224 and consequently the upper bed conduit system 222 are freely longitudinally movable with respect to the longitudinally extending rigid first portion of the main partition conduit 218 and to the tank 208. The upper bed conduit system 222 is connected to the exterior of the tank 208 by a main upper bed conduit system fluid conduit 226 having a rigid first portion 228 which extends generally longitudinally with respect to the tank 208 and a flexible second portion 230 which extends to the wall of the tank 208 and is connected to the first portion 228. This second portion 230 permits the longitudinal movement of the upper bed conduit system 222. The rigid first portion 228 of the main upper bed fluid conduit 226 is connected at its lower end to the upper bed conduit system 222 and is generally parallel to and spaced from the first rigid portion of the main partition fluid conduit 218. A second guide sleeve 232 is situated in the support for the first guide sleeve 220. This guide sleeve 232 provides an opening through which the rigid first portion 228 of the main upper bed conduit 226 extends thus assisting in preventing lateral movement of the upper bed conduit system 222. Longitudinal movement of the upper bed conduit system 222 is limited by the stops or protrusions 234 extending from the rigid first portion 228 of the main upper bed conduit 226 which act to engage the guide sleeve 232. In lieu of lower stop 234, a spring could be attached from top of tank 208 to top of rigid first portion 228.

In some cases the liquid being treated in the liquid treatment tank may require additional treatment outside the tank after passing through a first liquid treatment bed but prior to passage through the second liquid treatment bed. In this instance the bed partition is made totally impermeable. Referring to FIG. 7, a tank 236 has an upper bed 238 and a lower bed 240 separated by a impermeable bed partition 242. The bed partition 242 is otherwise similar in structure to the bed partitions previously discussed in that it is generally flat, circular in shape and perpendicular with respect to the longitudinal axis of the tank 236. The partition 242 has an annular sealing member 244 about its periphery to prevent the passage of any fluids or liquid treatment material between the partition 242 and wall of the tank 236. The impermeable bed partition 242 rests on and is supported by the lower bed 240 and in turn supports the upper bed 238. A first partition conduit system 246 is attached to and positioned immediately above the partition 242. The conduit system 246 is disposed in a plane immediately adjacent and parallel to impermeable partition 242 and comprises conduits for the collection or distribution of fluids about the base of the upper bed 238. A second partition conduit system 248 similar to the first partition conduit system 246 is attached to and positioned immediately below the partition 242. This second partition conduit system 248 is used to collect or distribute fluids immediately below the partition 242 about the top of the lower bed 240. A first main partition fluid conduit 250 passes between the inside and the outside of the tank 236 and is connected to the first partition conduit system 246. A second main partition conduit 252 similarly connects the second partition conduit system 248 with the exterior of the tank 236. Both main partition conduits 250 and 252 have structures similar to the main partition conduit 26 of FIG. 1. The bed partition 242 and the first and second partition conduit system 246 and 248 attached to it are freely longitudinally movable with respect to the tank 236 in response to expansion and contraction of the lower bed 240. Connected to the first main partition conduit 250 is an external conduit 254 by which liquid after treatment by the upper bed 238 is transported to an intermediate treatment stage 258 (i.e., a degasifier). A second external conduit 256 returns the treated liquid to the tank 236 and into the second main partition conduit 252 for distribution at the top of the lower bed 240. The liquid is driven by the pump 260. The structure is such that a liquid may be removed from the tank 236 at the interface of the two beds 238 and 240 regardless of the longitudinal location of the interface. The liquid can then be externally treated and returned to the same longitudinal location without intermixing of the liquid leaving with that returning. The two beds can be regenerated in place with appropriate pipe, valves, etc.

Figure 8:
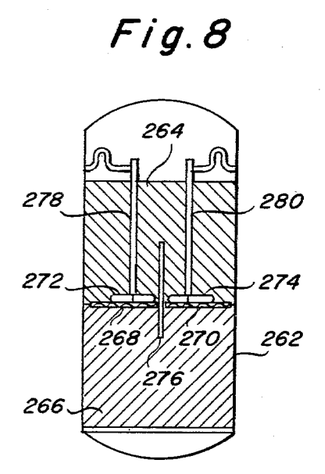
FIG. 8 is a schematic representation of an apparatus for larger tanks in which the bed partition is subdivided into a plurality of sectors.
Figure 9:
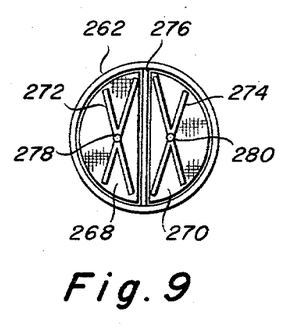
FIG. 9 is a schematic cross-sectional view of the apparatus of FIG. 8.

In large diameter tanks the bed partition may be divided into a number of independently operating units. Referring to FIGS. 8 and 9, a generally vertically disposed liquid treatment tank 262 has situated therein an upper bed 264 of a liquid treatment material and a lower bed 266 of a liquid treatment material. At least the lower bed 266 is volume variable. The beds 264 and 266 are separated by two fluid permeable semi-circular bed partition sectors 268, 270. The two partition sectors 268, 270 define a complete circle with each sector being supported by the portion of the lower bed 266 over which it is situated and in turn supporting the base of the upper bed 264 under which it is located. Each partition sector 268, 270 is freely longitudinally movable with respect to the tank 262 in response to expansion and contraction of the lower bed 266. Each partition sector 268, 270 has a partition conduit system 272, 274 for collecting and distributing fluids between the beds 264, 266. The partition sectors 268, 270 are separated from one another by a wall 276 which coincides with a diameter of the tank 262 and extends longitudinally within the tank 262 into the upper and lower beds 264, 266 past the limits of the longitudinal travel of the partition sectors 268, 270. The partition sectors 268, 270 have seals about their peripheries which slideably engage the inside wall of the tank 262 and the wall 276 to prevent the passage of any liquid treatment material between the partition sectors 268, 270 and the tank wall or the wall 276. Each partition conduit system 272, 274 is connected to the outside of the tank 262 by a main partition fluid conduit 278, 280 which passes between the inside and the outside of the tank 262 and which has a structure similar to the main partition conduit 26 of FIG. 1.

While tank 262 has been shown with two semi-circular partition sectors 268, 270, any plurality of partitions separating the beds may be used as long as all the partitions define a complete circle. In the event more than two partitions are used, the interior wall 276, rather than being situated on a diameter of the tank 262, will comprise a plurality of walls coinciding with the radii of the tank 262 extending transversely from the longitudinal axis of the tank 262 to the inside wall of the tank 262.

Figure 10:
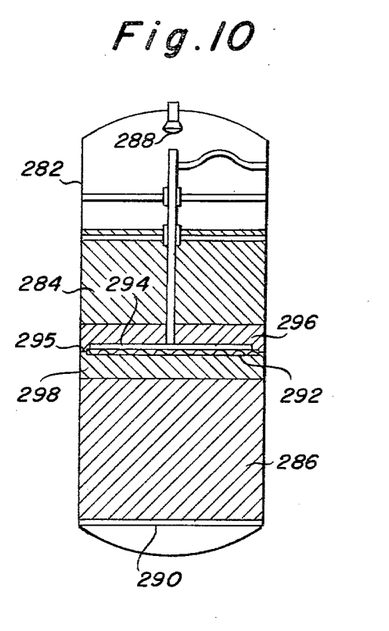
FIG. 10 is a schematic representation of an apparatus according to the invention in which layers of inert material are placed immediately above and immediately below the bed partition.

Should it be desirable for any reason to prevent the liquid treatment materials of the respective beds from contacting the partition, layers of inert particulate material may be provided immediately below and immediately above the bed partition. Referring to FIG. 10, a generally vertically disposed liquid treatment tank 282 has located therein generally one above the other an upper bed 284 and a lower bed 286 of particulate liquid treatment materials. The tank 282 includes an upper collector/distributor 288 and a lower collector/distributor 290 for the addition and removal of fluids to and from the tank 282. Situated between the beds 284, 286 is a fluid permeable bed partition 292 having a partition conduit system 294 and a peripheral seal 295 all of which are similar in construction and function to the permeable partition 20, partition conduit system 24 and seal 22 of the device of FIG. 1. Positioned immediately above the partition 292 and situated between the partition 292 and the bottom of the upper bed 284 is an upper layer 296 of inert particulate material having a greater density than the liquid treatment material of the upper bed 284. The upper layer 296 is free to mix with the upper bed material since it is not separated from the upper bed 284 by a screen or other separatory structure. Positioned immediately below the partition 292 between the partition 292 and the top of the lower bed 286 is a lower layer 298 of inert particulate material. The lower layer particulate material has a lesser density than the liquid treatment material of the lower bed 286 and is free to mix with the material of the lower bed 286 since it too has no separatory structure between it and the lower bed 286. Due to the relative densities, the particulate material of the upper layer 296 tends always to settle below the bed 284 to rest upon the bed partition 292 while the particulate material of the lower layer 298 tends to rise above the material of the lower bed 286 to remain between it and the bed partition 292. Thus the contents of the respective beds 284, 286 are prevented from contacting the partition 292 and the partition seal 295. In the alternative, only an upper layer 296, or a lower layer 290 of inert particulate material may be used.

The fluid permeable bed partition may be of any appropriate construction. The simplest structure is a screen with an appropriate mesh size. Instead of a simple mesh screen, the partition may be a metal plate having holes evenly spaced throughout its surface area. Strainers or screens would then be placed on one or both sides of the plate over these holes through which the fluids traversing the tank would be free to move.

Figure 11:
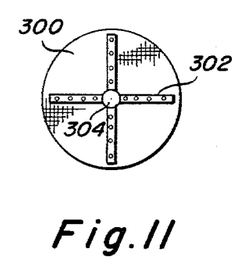
FIGS. 11 through 13 are schematic representations of various partition conduit systems mounted on the bed partition.
Figure 12:
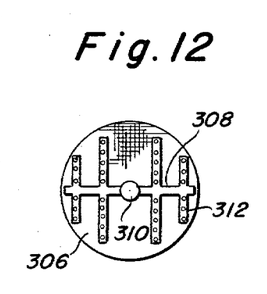
Figure 13:
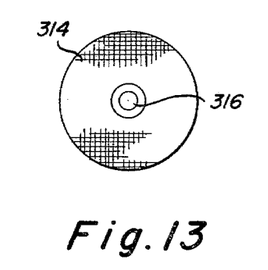

Likewise the partition conduit system may be of any design which will insure a good distribution or collection of fluid from the plane in which it is located. The partition conduit system may be attached to the bed partition by welding it and, in the absence of any other structural support or in combination with other structural support, the partition conduit system would provide structural strength to a screen-type or a plate type bed partition. Referring to FIG. 11 a screen 300 forming a bed partition has a conduit system comprising a plurality of radially extending conduits 302 each with spaced holes therein for the entrance or exiting of fluids. The main partition fluid conduit 304 is centrally located at the junction of the conduits 302 of the partition conduit system. In FIG. 12 a screen type bed partition 306 has a partition conduit system in which a diametrically arranged header conduit 308 has a plurality of spaced lateral conduits 312 perpendicular thereto. Located on the conduits 312 are spaced holes for the entering and exiting of the fluids. Holes in conduits 302 and 312 are covered by screens. At its middle the header conduit 308 joins the main partition fluid conduit 312 communicating with the exterior of the tank in which the system is used. Referring to FIG. 13 a screen-type bed partition 314 is shown having a partition conduit system comprising a centrally located outlet 316 at the end of the main partition fluid conduit (not shown). This outlet 316 may include a strainer or screen device to distribute the fluid therefrom and may have collecting means to assist in the collection of fluid for removal from the tank in which it is used.

Figure 14:
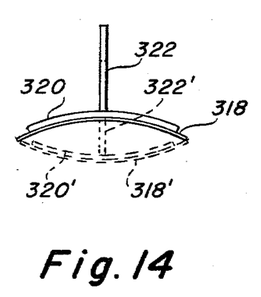
FIG. 14 is a schematic representation of a flexible bed partition and partition conduit system according to the invention.

A bed partition and its partition conduit system may be made responsive to the expansion and contraction of the beds between which they are situated by making them wholly or partly of flexible or resilient material such as certain synthetic resin materials. FIG. 14 shows a structure having a flexible screen 318 with a flexible partition conduit system 320 connected to a main partition fluid conduit 322. The assembly flexes upwards and downwards in response to changes in volumes of the beds above and beneath it.

Figure 15:
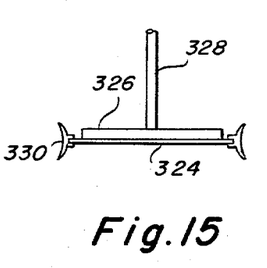
FIG. 15 is a schematic representation of a bed partition and partition conduit system showing an annular seal about the periphery thereof; and, FIG. 16 is a schematic representation of a permeable bed partition and partition conduit system according to the invention with a guide sleeve.

Different type sealing means may be used about the periphery of the bed partition to insure that the contents of the beds immediately above and below the partition do not pass between the periphery of the partition and the wall of the tank. In FIG. 15 a bed partition 324 having a partition conduit system 326 and a main partition fluid conduit 328 has an annular sealing member 330 with a cross-sectional cup shape for a good sliding seal with the wall of the tank in which it is used. Seals that are extendable can be attached to the bed partition and the vessel wall.

Figure 16:
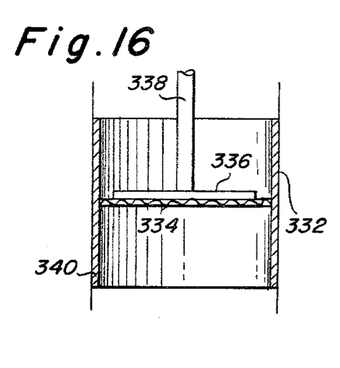

Various structures may be used in preventing the lateral movement of the bed partition, partition conduit system and longitudinal portion of the main partition fluid conduit while permitting the longitudinal movement thereof. Referring to FIG. 16, a tank 332 has a fluid permeable bed partition 334 with a partition conduit system 336 forming a part thereof. A main partition fluid conduit 338 communicating with the outside of the tank 332 is connected to the partition conduit system 336. Attached to the periphery of the partition 334 is a longitudinally extending cylindrical sleeve 340 which slideably engages the inside wall of the tank 332. The cylinder 340 is of such a length as to prevent any lateral movement of the partition 334 in its longitudinal movements. The guide cylinder 340 may be attached to the partition conduit system 336 or both the bed partition 334 and the partition conduit system 336. Instead of a solid cylinder the cylinder 340 may be an open network of angle irons which project upward and downward from the periphery of the partition 334 having a circular bar joining them at their upper and lower extremities, the circular bars lying in planes perpendicular to the longitudinal axis of the tank 332 thus forming a cage-type cylinder. In both embodiments a seal (not shown) would be located between the cylinder 340 and the wall of the tank 332.

The fluid permeable bed partition may be a layer of porous foam connected to the partition conduit system or the partition conduit system may be embedded in the foam partition.

The liquid treatment tank of this invention may be used individually or a plurality of tanks may be used in parallel or in series in a liquid treatment plant.

As mentioned previously the liquid treatment materials making up the liquid treatment beds are not limited to ion exchange resins. This invention may be used in many other applications where liquids are to be treated and in which the respective treatment beds are to be kept separated and individual treatment of the beds is necessary while one or more of the beds are volume variable. Thus in a two bed tank the beds may be: a filtration media (such as filter sand) and activated carbon, a filtration medium and an ion exchange resin, activated carbon and an ion exchange resin, and organic absorption resin and ion exchange resin. There are others.

The present invention may be used in tanks containing more than two fluid permeable liquid treatment beds in which the beds are arranged in longitudinal sequence generally one above the other and in which at least one of the beds beneath the topmost bed is volume variable although all or a portion of the total number of beds may be volume variable. Each of the one or more volume variable beds would have a freely longitudinally movable partition positioned between it and the next bed above it. Each bed partition would have a partition conduit system associated with it and a main partition fluid conduit connecting the partition conduit system with the exterior of the tank.

While this invention has been described as having a preferred design, it will be understood that it is capable of further modification. This application, is, therefore, intended to cover any variations, uses, or adaptations of the invention following the general principles thereof and including such departures from the present disclosure as come within known or customary practice in the art to which this invention pertains, and as may be applied to the essential features hereinbefore set forth and fall within the scope of this invention or the limits of the claims.

What is claimed is:
1. A liquid treatment apparatus, comprising:
a generally vertically disposed tank having a plurality of fluid permeable beds arranged in longitudinal sequence in said tank generally one above the other, each of said beds being composed of a liquid treatment material and at least one of said beds beneath the top most bed being volume variable;

each said at least one volume variable bed having a fluid permeable partition situated above said bed separating said bed from the next bed, each said partition being freely longitudinally movable with respect to said tank and including partition conduit means for collecting and distributing fluids at said partition, each said partition conduit means being an integral part of its partition and being freely longitudinally movable therewith;

each said partition having associated therewith a main fluid conduit passing between the inside and the outside of said tank to which said partition conduit means is connected; and, each said partition including sealing means about its periphery which engages the inside wall of said tank to prevent the passage of said liquid treatment material between said partition and said inside wall while permitting the relative movement of said partition with respect to said tank.

2. A liquid treatment apparatus, comprising:

a generally vertically disposed tank having a plurality of fluid permeable beds arranged in longitudinal sequence in said tank generally one above the other, each of said beds being volume variable and composed of liquid treatment material;

fluid permeable partitions in said tank separating said beds, each of said partitions being freely longitudinally movable with respect to said tank and each of said partitions including partition conduit means for collecting and distributing fluids at that partition, each said partition conduit means being an integral part of its partition and being freely longitudinally movable therewith; p1 each of said partitions having associated therewith a main fluid conduit passing between the inside and the outside of said tank to which said partition conduit means is connected; and, each of said partitions including sealing means about its periphery which engages the inside wall of said tank to prevent the passage of said liquid treatment material between said partition and said inside wall while permitting the relative movement of said partition with respect to said tank.

3. A liquid treatment apparatus, comprising:

a generally vertically disposed tank having two fluid permeable beds therein arranged generally one above the other so as to define an upper bed and a lower bed, each of said beds being composed of a liquid treatment material with at least said lower bed being volume variable;

a fluid permeable partition in said tank separating said beds, said partition supported by said lower bed and in turn supporting said upper bed, said partition being freely longitudinally movable with respect to said tank in response to expansion and contraction of said lower bed and including partition conduit means for collecting and distributing fluids between said beds, said partition conduit means being an integral part of said partition and being freely longitudinally movable therewith;

a main partition fluid conduit passing between the inside and the outside of said tank to which said partition conduit means is connected; and, said partition including sealing means about its periphery which engages the inside wall of said tank to prevent the passage of said liquid treatment material between said partition and said inside wall while permitting the relative movement of said partition with respect to said tank.

4. The liquid treatment apparatus of claim 3 wherein: the top of said upper bed is spaced from the top of said tank; and, said tank includes an upper conduit means for collecting and distributing fluid adjacent the top of said tank above said upper bed and an upper bed conduit means situated within said upper bed adjacent the top thereof for collecting and distributing fluid adjacent the top of said upper bed.

5. The liquid treatment apparatus of claim 3 wherein said main partition fluid conduit passing between the inside and the outside of said tank includes a flexible portion permitting the longitudinal movement of said partition.

6. The liquid treatment apparatus of claim 3 wherein said main partition fluid conduit passing between the inside and the outside of said tank includes a generally longitudinally extending rigid first portion having its lower end connected to said partition conduit means and a flexible second portion connected to said rigid first portion and extending to the wall of said tank, said flexible second portion permitting the longitudinal movement of said partition.

7. The liquid treatment apparatus of claim 6 wherein said rigid first portion of said main partition fluid conduit extends through said upper bed and situated thereon within said upper bed adjacent the top of said upper bed is an upper bed conduit means for collecting and distributing fluid within said upper bed adjacent the top of said upper bed, said upper bed conduit means being fixed to said first portion so that longitudinal movement of said partition in response to expansion and contraction of said lower bed will cause a corresponding longitudinal movement of said upper bed conduit means.

8. The liquid treatment apparatus of claim 7 and including a flexible conduit connected to said upper bed conduit means and to the wall of said tank for the passage of fluid collected or to be distributed by said upper bed conduit means.

9. The liquid treatment apparatus of claim 6 wherein said tank includes an upper bed conduit means situated within said upper bed adjacent the top thereof for collecting and distributing fluid within said upper bed adjacent the top of said upper bed, said upper bed conduit means having an opening through which said rigid first portion of said main partition fluid conduit extends and said upper bed conduit means being freely longitudinally movable with respect to said tank and said rigid first portion of said main partition fluid conduit.

10. The liquid treatment apparatus of claim 9 wherein said tank includes a main upper bed fluid conduit passing between the inside and the outside of said tank to which said upper bed conduit means is connected, said main upper bed conduit including a generally longitudinally extending rigid first portion spaced from and generally extending rigid first portion spaced from and generally parallel to said rigid first portion of said main partition fluid conduit and having its lower end connected to said upper bed conduit means; and, said main upper bed conduit also including a flexible second portion extending to the wall of said tank and connected to said first portion of said main upper bed conduit, said flexible second portion permitting the longitudinal movement of said upper bed conduit means.

11. The liquid treatment apparatus of claim 10 and including guide means cooperating with said first portion of said main upper bed conduit for preventing lateral movement of said upper bed conduit means.

12. The liquid treatment apparatus of claim 9 and including a flexible conduit connected to said upper bed conduit means and to the wall of said tank for the passage of fluid collected or to be distributed by said upper bed conduit means.

13. The liquid treatment apparatus of claim 6 and including guide means for preventing lateral movement of said partition and upper and lower stop means for limiting the longitudinal movement of said partition.

14. The liquid treatment apparatus of claim 13 wherein said guide means comprises a longitudinally extending cylindrical sleeve connected to said partition about the periphery of said partition and freely longitudinally movable with said partition.

15. The liquid treatment apparatus of claim 13 wherein said guide means comprises an annular sleeve fixed in position relative to said tank through which said rigid first portion of said main partition fluid conduit extends and through which said rigid first portion is freely lontitudinally movable.

16. The liquid treatment apparatus of claim 3 and including guide means for preventing lateral movement of said partition and upper and lower stop means for limiting the longitudinal movement of said partition.

17. The liquid treatment apparatus of claim 3 and including lifting means for lifting said partition from said lower bed.

18. The liquid treatment apparatus of claim 3 wherein:
said beds are composed of particulate treatment material and said tank contains a lower layer of inert particulate material positioned between said lower bed and said partition and an upper layer of inert particulate material positioned between said upper bed and said partition;
said lower layer particulate material having a lesser density than said lower bed liquid treatment material; and,
said upper layer particulate material having a greater density than said upper bed liquid treatment material.

19. The liquid treatment apparatus of claim 3 wherein a plurality of main partition fluid conduits pass between the inside and the outside of said tank, said main partition fluid conduits being connected to said partition conduit means.

20. The liquid treatment apparatus of claim 3 wherein said partition conduit means comprises a diametrically arranged header conduit having a plurality of spaced lateral conduits projecting therefrom.

21. The liquid treatment apparatus of claim 3 wherein said partition conduit means comprises a plurality of radially extending conduits.

22. The liquid treatment apparatus of claim 3 wherein said partition conduit means comprises a centrally located outlet at said main partition fluid conduit.

23. The liquid treatment apparatus of claim 3 wherein said partition comprises a layer of porous foam.

24. The liquid treatment apparatus of claim 3 wherein said partition comprises a layer of porous foam and said partition conduit means is embedded in said foam.

25. The liquid treatment apparatus of claim 3 wherein said partition comprises a screen.

26. The liquid treatment apparatus of claim 3 wherein said partition comprises a flexible screen of synthetic resin material and said partition conduit means comprises flexible conduits of synthetic resin material.

27. The liquid treatment apparatus of claim 3 wherein said partition comprises a plate having holes evenly spaced throughout its surface area, said holes having screening means located over them.

28. The liquid treatment apparatus of claim 3 wherein said beds are composed of particulate liquid treatment material and said tank contains a layer of inert particulate material positioned between said lower bed and said partition, said inert particulate material having a lesser density than said lower bed liquid treatment material.

29. The liquid treatment apparatus of claim 3 wherein said beds are composed of particulate liquid treatment material and said tank contains a layer of inert particulate material positioned between said upper bed and said partition, said inert particulate material having a greater density than said upper bed liquid treatment material.

30. A liquid treatment apparatus, comprising:
a generally vertically disposed tank having two fluid permeable beds therein arranged generally one above the other so as to define an upper bed and a lower bed, each of said beds being composed of a liquid treatment material with at least said lower bed being volume variable;
a plurality of fluid permeable partitions separating said beds, each of said partitions being a sector of a circle such that all of said partitions define a complete circle with each of said partitions being supported by a portion of the surface area of said lower bed and in turn supporting a portion of the surface of said upper bed;
each of said partitions being freely longitudinally movable with respect to said tank in response to expansion and contraction of said lower bed;
said partitions being separated from one another by walls coinciding with the radii of said tank extending transversely from the longitidinal axis of said tank to the wall thereof and extending longitudinally into said upper and lower beds past the limits of the longitudinal travel of said partitions;
each of said partitions including a partition conduit means for collecting and distributing fluid between said beds and a main partition fluid conduit passing between the inside and the outside of said tank to which said partition conduit means is connected, each said partition conduit means being an integral part of its partition and being freely longitudinally movable therewith; and,
each of said partitions also including sealing means about its periphery which engages the inside wall of said tank and said radial walls to prevent the passage of said liquid treatment material between said partition and said tank wall or said radial walls while permitting the relative movement of said partition with respect to said tank wall and said radial walls.

31. A liquid treatment apparatus, comprising:
a generally vertically disposed tank having two fluid permeable beds therein arranged generally one above the other so as to define an upper bed and a lower bed, each of said beds being composed of a liquid treatment material with at least said lower bed being volume variable;
an impermeable partition in said tank separating said beds, said partition supported by said lower bed and in turn supporting said upper bed, said partition being freely longitudinally movable with respect to said tank in response to expansion and contraction of said lower bed and including sealing means about its periphery which engages the inside wall of said tank to prevent the passage of said liquid treatment material between said partition and said inside wall while permitting the relative movement of said partition with respect to said tank;

a first partition conduit means attached to and positioned immediately above said partition for collecting and distributing fluids immediately above said partition, said first partition conduit means being freely longitudinally movable with said partition;

a second partition conduit means attached to and positioned immediately below said partition for collecting and distributing fluids immediately below said, said second partition conduit means being freely longitudinally movable with said partition;

a first main partition fluid conduit passing between the inside and the outside of said tank to which said first partition conduit means is connected; and, a second main partition fluid conduit passing between the inside and the outside of said tank to which said second partition conduit means is connected.

32. The liquid treatment apparatus of claim 31 wherein:

said first main partition fluid conduit includes a generally longitudinally extending rigid first portion connected at its lower end to said first partition conduit means and a flexible second portion connected to said first portion and extending to the wall of said tank, said flexible second portion permitting the longitudinal movement of said partition; and, said second main partition fluid conduit includes a generally longitudinally extending rigid first portion connected at its lower end to said second partition conduit means and a flexible second portion connected to said first portion and extending to the wall of said tank, said flexible second portion permitting the longitudinal movement of said partition.

33. The liquid treatment apparatus of claim 32 and including guide means cooperating with said first portions of said first and second main partition fluid conduits for preventing lateral movement of said partition.

* * * * *